US011792169B2

United States Patent
Anderson et al.

(10) Patent No.: US 11,792,169 B2
(45) Date of Patent: Oct. 17, 2023

(54) CLOUD STORAGE USING ENCRYPTION GATEWAY WITH CERTIFICATE AUTHORITY IDENTIFICATION

(71) Applicant: SECURION SYSTEMS, INC., Centerville, UT (US)

(72) Inventors: Jordan Anderson, Centerville, UT (US); Richard J. Takahashi, Layton, UT (US); Sean Little, N. Salt Lake, UT (US); Lee Noehring, Peoria, AZ (US)

(73) Assignee: SECURION SYSTEMS, INC., Centerville, UT (US)

( * ) Notice: Subject to any disclaimer, the term of this patent is extended or adjusted under 35 U.S.C. 154(b) by 0 days.

(21) Appl. No.: 17/672,354

(22) Filed: Feb. 15, 2022

(65) Prior Publication Data

US 2022/0174050 A1 Jun. 2, 2022

Related U.S. Application Data

(63) Continuation of application No. 15/688,743, filed on Aug. 28, 2017, now Pat. No. 11,283,774, which is a (Continued)

(51) Int. Cl.
*H04L 9/40* (2022.01)
*H04L 9/14* (2006.01)
*G06F 21/60* (2013.01)

(52) U.S. Cl.
CPC ........ *H04L 63/0428* (2013.01); *G06F 21/602* (2013.01); *H04L 9/14* (2013.01);
(Continued)

(58) Field of Classification Search
CPC ............. H04L 63/0471; H04L 63/0478; H04L 63/0428; H04L 63/0869; H04L 63/0823;
(Continued)

(56) References Cited

U.S. PATENT DOCUMENTS

| 4,319,079 A | 3/1982 | Best |
| 4,357,529 A | 11/1982 | Atalia |

(Continued)

FOREIGN PATENT DOCUMENTS

| EP | 2337304 | 6/2011 |
| EP | 3350974 | 7/2018 |

(Continued)

OTHER PUBLICATIONS

Blum, Thomas et al. Worcester Polytechnic Institute ECE Department. "Montgomery Modular Exponentiation on Reconfigurable Hardware" Apr. 1999. pp. 1-8, 8 pages.
(Continued)

*Primary Examiner* — Mohammad A Siddiqi
(74) *Attorney, Agent, or Firm* — Greenberg Traurig LLP

(57) ABSTRACT

Systems and methods to securely send or write data to a cloud storage or server. In one embodiment, a method includes: establishing a connection to a client using a client-side transport protocol; receiving, over the connection, data from the first client; decrypting, using a client session key, the received data to provide first decrypted data; encrypting the first decrypted data using a stored payload key (that is associated with the client) to provide first encrypted data; encrypting, using a cloud session key, the first encrypted data using a remote-side transport protocol to provide second encrypted data; and sending the second encrypted data to the cloud storage or server.

18 Claims, 9 Drawing Sheets

Related U.S. Application Data continuation-in-part of application No. 15/264,840, filed on Sep. 14, 2016, now Pat. No. 9,794,064.

(60) Provisional application No. 62/518,117, filed on Jun. 12, 2017, provisional application No. 62/219,795, filed on Sep. 17, 2015.

(52) U.S. Cl.
CPC ...... *H04L 63/0471* (2013.01); *H04L 63/0478* (2013.01); *H04L 63/061* (2013.01); *H04L 63/0823* (2013.01); *H04L 63/0869* (2013.01); *H04L 63/0876* (2013.01); *H04L 2209/76* (2013.01)

(58) Field of Classification Search
CPC ..... H04L 9/14; H04L 63/061; H04L 2209/76; H04L 63/0876; G06F 21/602
See application file for complete search history.

(56) References Cited

U.S. PATENT DOCUMENTS

| | | | |
|---|---|---|---|
| 5,594,797 A | 1/1997 | Alan ar a et al. | |
| 5,602,916 A | 2/1997 | Grube | |
| 5,631,960 A | 5/1997 | Likens et al. | |
| 5,892,962 A | 4/1999 | Cloutier | |
| 5,915,025 A | 6/1999 | Taguchi et al. | |
| 5,961,626 A | 10/1999 | Harrison et al. | |
| 5,995,628 A | 11/1999 | Kitaj et al. | |
| 6,044,388 A | 3/2000 | DeBellis et al. | |
| 6,081,895 A | 6/2000 | Harrison et al. | |
| 6,101,255 A | 8/2000 | Harrison et al. | |
| 6,128,666 A | 10/2000 | Muller et al. | |
| 6,275,588 B1 | 8/2001 | Videcrantz et al. | |
| 6,304,973 B1 | 10/2001 | Williams | |
| 6,351,813 B1 | 2/2002 | Mooney | |
| 6,378,072 B1 | 4/2002 | Collins | |
| 6,515,993 B1 | 2/2003 | Williams et al. | |
| 6,550,012 B1 | 4/2003 | Villa et al. | |
| 6,577,734 B1 | 6/2003 | Etzel et al. | |
| 6,598,161 B1 | 7/2003 | Kluttz et al. | |
| 6,715,028 B1 | 3/2004 | Toda | |
| 6,845,446 B1 | 1/2005 | Fuller | |
| 7,171,000 B1 | 1/2007 | Toh et al. | |
| 7,200,756 B2 | 4/2007 | Griffin et al. | |
| 7,277,941 B2 | 10/2007 | Ignatius et al. | |
| 7,370,348 B1 | 5/2008 | Patel | |
| 7,382,787 B1 | 6/2008 | Barnes et al. | |
| 7,421,576 B1 | 9/2008 | Kent | |
| 7,496,764 B2 | 2/2009 | Robert | |
| 7,594,262 B2 | 9/2009 | Hanzlik et al. | |
| 7,607,167 B1 | 10/2009 | Johnson et al. | |
| 7,639,696 B2 | 12/2009 | Wu | |
| 7,644,268 B2 | 1/2010 | Filipi-Martin et al. | |
| 7,716,467 B1 | 5/2010 | Deffet et al. | |
| 7,734,844 B2 | 6/2010 | Pedersen et al. | |
| 7,773,754 B2 | 8/2010 | Buer et al. | |
| 7,804,504 B1 | 9/2010 | Agarwal | |
| 7,814,316 B1 | 10/2010 | Hughes et al. | |
| 7,836,490 B2 | 11/2010 | Smith | |
| 7,849,306 B2 * | 12/2010 | Takeshima | H04L 67/02 713/153 |
| RE42,212 E | 3/2011 | Hoffman | |
| 7,908,472 B2 | 3/2011 | Freed et al. | |
| 7,920,701 B1 | 4/2011 | Cox et al. | |
| 7,921,284 B1 | 4/2011 | Kinghorn et al. | |
| 7,921,288 B1 | 4/2011 | Hildebrand | |
| 7,930,540 B2 | 4/2011 | Ahuja et al. | |
| 7,930,756 B1 | 4/2011 | Crocker et al. | |
| 7,958,351 B2 | 6/2011 | Luthl | |
| 7,996,670 B1 | 8/2011 | Krishna et al. | |
| 8,065,713 B1 | 11/2011 | Vainstein et al. | |
| 8,073,949 B2 | 12/2011 | Cunchon et al. | |
| 8,166,289 B2 | 4/2012 | Owens et al. | |
| 8,219,799 B1 | 7/2012 | Lucchesi | |
| 8,229,116 B2 | 7/2012 | Ogata | |
| 8,230,207 B2 | 7/2012 | Iyer et al. | |
| 8,234,686 B2 | 7/2012 | Alvermann et al. | |
| 8,266,433 B1 | 9/2012 | Przykucki et al. | |
| 8,266,670 B1 | 9/2012 | Merkow et al. | |
| 8,275,984 B2 | 9/2012 | Loveless | |
| 8,289,975 B2 | 10/2012 | Suganthi et al. | |
| 8,307,206 B2 | 11/2012 | Ahuja et al. | |
| 8,356,177 B2 | 1/2013 | McGrew et al. | |
| 8,386,768 B2 | 2/2013 | Nair et al. | |
| 8,407,194 B1 | 3/2013 | Chaput et al. | |
| 8,416,954 B1 | 4/2013 | Raizen et al. | |
| 8,418,252 B2 | 4/2013 | Akyol et al. | |
| 8,433,783 B2 | 4/2013 | Jackowski et al. | |
| 8,433,929 B2 | 4/2013 | Yamashita | |
| 8,438,626 B2 | 5/2013 | Anderson et al. | |
| 8,443,069 B2 | 5/2013 | Bagepalli et al. | |
| 8,452,956 B1 | 5/2013 | Kersey | |
| 8,479,304 B1 | 7/2013 | Clifford | |
| 8,533,494 B2 | 9/2013 | Harada | |
| 8,536,957 B1 | 9/2013 | Nakamura et al. | |
| 8,539,571 B2 | 9/2013 | Smith | |
| 8,561,127 B1 | 10/2013 | Agrawal et al. | |
| 8,595,814 B2 | 11/2013 | Le et al. | |
| 8,631,460 B2 | 1/2014 | Shea et al. | |
| 8,681,974 B1 | 3/2014 | Langhammer | |
| 8,751,826 B2 | 6/2014 | O'Connor et al. | |
| 8,811,620 B2 | 8/2014 | Chaves et al. | |
| 8,813,247 B1 | 8/2014 | Alten | |
| 8,909,942 B1 | 12/2014 | Obukhov et al. | |
| 8,935,523 B1 | 1/2015 | Osburn, III | |
| 8,966,249 B2 | 2/2015 | Lindteigen | |
| 8,966,288 B2 | 2/2015 | Ignatius et al. | |
| 8,988,713 B2 | 3/2015 | Gutnik et al. | |
| 9,088,538 B2 | 7/2015 | Lindteigen et al. | |
| 9,100,361 B1 | 8/2015 | Lucchesi et al. | |
| 9,191,200 B1 | 11/2015 | Adams et al. | |
| 9,227,139 B2 | 1/2016 | Mamtani et al. | |
| 9,245,148 B2 | 1/2016 | Runkis et al. | |
| 9,306,917 B2 * | 4/2016 | Brugger | G06F 21/60 |
| 9,317,705 B2 | 4/2016 | O'Hare et al. | |
| 9,317,718 B1 | 4/2016 | Takahashi | |
| 9,355,279 B1 | 5/2016 | Takahashi | |
| 9,374,344 B1 | 6/2016 | Takahashi | |
| 9,374,345 B2 | 6/2016 | Brugger et al. | |
| 9,378,359 B2 | 6/2016 | Qureshi et al. | |
| 9,380,048 B2 | 6/2016 | Lindteigen et al. | |
| 9,524,399 B1 | 12/2016 | Takahashi | |
| 9,536,103 B2 | 1/2017 | Redberg | |
| 9,560,019 B2 | 1/2017 | Barney | |
| 9,660,964 B2 | 5/2017 | Asiedu | |
| 9,680,801 B1 | 6/2017 | Martini | |
| 9,690,598 B2 | 6/2017 | Lindteigen | |
| 9,692,605 B2 | 6/2017 | Lindteigen et al. | |
| 9,705,854 B2 | 7/2017 | Khazan | |
| 9,794,064 B2 * | 10/2017 | Anderson | H04L 9/0894 |
| 9,794,270 B2 | 10/2017 | Lindteigen | |
| 9,798,899 B1 | 10/2017 | Takahashi | |
| 9,858,442 B1 | 1/2018 | Takahashi | |
| 9,871,662 B2 | 1/2018 | Glisson | |
| 9,916,456 B2 | 3/2018 | O'Hare et al. | |
| 10,013,580 B2 | 7/2018 | Takahashi | |
| 10,114,766 B2 | 10/2018 | Takahashi | |
| 10,708,236 B2 | 7/2020 | Takahashi | |
| 10,902,155 B2 | 1/2021 | Takahashi | |
| 11,063,914 B1 | 7/2021 | Takahashi | |
| 11,283,774 B2 * | 3/2022 | Anderson | G06F 21/602 |
| 11,288,402 B2 | 3/2022 | Takahashi | |
| 11,429,540 B2 | 3/2022 | Takahashi | |
| 2001/0042124 A1 | 11/2001 | Barron | |
| 2002/0027906 A1 | 3/2002 | Athreya | |
| 2002/0029280 A1 | 3/2002 | Holden | |
| 2002/0083317 A1 | 6/2002 | Ohta | |
| 2002/0091975 A1 | 7/2002 | Redlich et al. | |
| 2002/0099959 A1 | 7/2002 | Redlich et al. | |
| 2002/0162024 A1 | 10/2002 | Cunchon | |
| 2002/0165961 A1 | 11/2002 | Everdell et al. | |
| 2003/0012373 A1 | 1/2003 | Ogura et al. | |

(56) References Cited

U.S. PATENT DOCUMENTS

| | | |
|---|---|---|
| 2003/0014627 A1 | 1/2003 | Krishna et al. |
| 2003/0023846 A1 | 1/2003 | Krishna |
| 2003/0051054 A1 | 3/2003 | Redlich et al. |
| 2003/0070077 A1 | 4/2003 | Redlich et al. |
| 2003/0074552 A1 | 4/2003 | Olkin et al. |
| 2003/0119484 A1 | 6/2003 | Adachi et al. |
| 2003/0120949 A1 | 6/2003 | Redlich et al. |
| 2003/0172279 A1 | 9/2003 | Yudasaka |
| 2003/0182435 A1 | 9/2003 | Redlich et al. |
| 2003/0196108 A1 | 10/2003 | Kung |
| 2003/0210702 A1 | 11/2003 | Kendall |
| 2004/0034772 A1 | 2/2004 | Mao |
| 2004/0054914 A1 | 3/2004 | Sullivan |
| 2004/0083286 A1 | 4/2004 | Holden |
| 2004/0114558 A1 | 6/2004 | Krishnamurthi et al. |
| 2004/0123096 A1 | 6/2004 | Buer |
| 2004/0123119 A1 | 6/2004 | Buer |
| 2004/0123120 A1 | 6/2004 | Buer |
| 2004/0123121 A1 | 6/2004 | Paaske |
| 2004/0123123 A1 | 6/2004 | Buer |
| 2004/0148500 A1 | 7/2004 | Olkin et al. |
| 2004/0151323 A1 | 8/2004 | Olkin et al. |
| 2004/0196979 A1 | 10/2004 | Cheng et al. |
| 2005/0010690 A1 | 1/2005 | Marshall et al. |
| 2005/0097357 A1 | 5/2005 | Smith |
| 2005/0132070 A1 | 6/2005 | Redlich et al. |
| 2005/0138109 A1 | 6/2005 | Redlich et al. |
| 2005/0138110 A1 | 6/2005 | Redlich et al. |
| 2005/0138654 A1 | 6/2005 | Minne |
| 2005/0166066 A1 | 7/2005 | Ahuja et al. |
| 2005/0190758 A1 | 9/2005 | Gai et al. |
| 2005/0198412 A1 | 9/2005 | Pedersen et al. |
| 2005/0198498 A1 | 9/2005 | Gaur |
| 2005/0198500 A1 | 9/2005 | Gaur |
| 2005/0257062 A1 | 11/2005 | Ignatius et al. |
| 2006/0015748 A1 | 1/2006 | Goto |
| 2006/0059537 A1 | 3/2006 | Alvermann et al. |
| 2006/0059553 A1 | 3/2006 | Morais |
| 2006/0117126 A1 | 6/2006 | Leung et al. |
| 2006/0129810 A1 | 6/2006 | Jeong |
| 2006/0133604 A1 | 6/2006 | Buer et al. |
| 2006/0140410 A1 | 6/2006 | Aihara |
| 2006/0149965 A1 | 7/2006 | Sharma |
| 2006/0174102 A1 | 8/2006 | Smith et al. |
| 2006/0174112 A1 | 8/2006 | Wray |
| 2007/0067630 A1 | 3/2007 | Lenkov et al. |
| 2007/0067634 A1 | 3/2007 | Siegler |
| 2007/0074020 A1 | 3/2007 | Nishimura |
| 2007/0115812 A1 | 5/2007 | Hughes |
| 2007/0136801 A1 | 6/2007 | Le et al. |
| 2007/0160198 A1 | 7/2007 | Orsini et al. |
| 2007/0192596 A1 | 8/2007 | Otsuka |
| 2007/0195951 A1 | 8/2007 | Leung |
| 2007/0195960 A1 | 8/2007 | Goldman |
| 2007/0204159 A1 | 8/2007 | Hara |
| 2007/0237327 A1 | 10/2007 | Taylor |
| 2007/0245413 A1 | 10/2007 | Andolina |
| 2007/0250921 A1 | 10/2007 | LiVecchi |
| 2007/0258586 A1 | 11/2007 | Huang et al. |
| 2008/0005569 A1 | 1/2008 | Watson et al. |
| 2008/0010233 A1 | 1/2008 | Sack |
| 2008/0022136 A1 | 1/2008 | Mattson |
| 2008/0037777 A1 | 2/2008 | Ignatius et al. |
| 2008/0052533 A1 | 2/2008 | Iida et al. |
| 2008/0052765 A1 | 2/2008 | Shinomiya et al. |
| 2008/0062803 A1 | 3/2008 | Fronte et al. |
| 2008/0091945 A1 | 4/2008 | Princen et al. |
| 2008/0098226 A1 | 4/2008 | Zokumasui |
| 2008/0130889 A1 | 6/2008 | Qi |
| 2008/0130894 A1 | 6/2008 | Qj |
| 2008/0141023 A1 | 6/2008 | Qi |
| 2008/0151893 A1 | 6/2008 | Nordmark et al. |
| 2008/0168135 A1 | 7/2008 | Redlich et al. |
| 2008/0181406 A1 | 7/2008 | Iyer et al. |
| 2008/0183992 A1 | 7/2008 | Martin et al. |
| 2008/0288782 A1 | 11/2008 | Iyer |
| 2009/0019527 A1 | 1/2009 | Winslow |
| 2009/0034734 A1 | 2/2009 | Owens et al. |
| 2009/0043901 A1 | 2/2009 | Mizikovsky et al. |
| 2009/0046858 A1 | 2/2009 | Iyer et al. |
| 2009/0097661 A1 | 4/2009 | Orsini et al. |
| 2009/0129388 A1 | 5/2009 | Akhtar et al. |
| 2009/0177894 A1 | 7/2009 | Orsini et al. |
| 2009/0178144 A1 | 7/2009 | Redlich et al. |
| 2009/0198997 A1 | 8/2009 | Yeap et al. |
| 2009/0228708 A1 | 9/2009 | Trostle |
| 2009/0249084 A1 | 10/2009 | Ogawa |
| 2009/0254572 A1 | 10/2009 | Redlich et al. |
| 2009/0254750 A1 | 10/2009 | Bono et al. |
| 2009/0327617 A1 | 12/2009 | Furuichi et al. |
| 2010/0010968 A1 | 1/2010 | Redlich et al. |
| 2010/0115260 A1 | 5/2010 | Venkatesan et al. |
| 2010/0153702 A1 | 6/2010 | Loveless |
| 2010/0153704 A1 | 6/2010 | Winslow |
| 2010/0161981 A1 | 6/2010 | Dodgson et al. |
| 2010/0169645 A1 | 7/2010 | McGrew et al. |
| 2010/0198730 A1 | 8/2010 | Ahmed et al. |
| 2010/0250497 A1 | 9/2010 | Redlich et al. |
| 2010/0254537 A1 | 10/2010 | Buer et al. |
| 2010/0274861 A1 | 10/2010 | Asiedu |
| 2010/0278338 A1 | 11/2010 | Chang et al. |
| 2010/0299313 A1 | 11/2010 | Orsini et al. |
| 2011/0069835 A1 | 3/2011 | Maliszewski et al. |
| 2011/0087889 A1 | 4/2011 | Iyer et al. |
| 2011/0131138 A1 | 6/2011 | Tsuchiya |
| 2011/0153969 A1 | 6/2011 | Petrick |
| 2011/0153985 A1 | 6/2011 | Saha et al. |
| 2011/0154019 A1 | 6/2011 | Wang |
| 2011/0154031 A1 | 6/2011 | Banerjee et al. |
| 2011/0167265 A1 | 7/2011 | Ahuja et al. |
| 2011/0202755 A1 | 8/2011 | Orsini et al. |
| 2011/0246766 A1 | 10/2011 | Orsini et al. |
| 2011/0246785 A1 | 10/2011 | Linsley et al. |
| 2011/0252236 A1 | 10/2011 | De Atley et al. |
| 2011/0252480 A1 | 10/2011 | Patawaran et al. |
| 2011/0264905 A1 | 10/2011 | Ovsiannikov |
| 2011/0283339 A1 | 11/2011 | Smith |
| 2011/0296440 A1 | 12/2011 | Laurich et al. |
| 2011/0311048 A1 | 12/2011 | Nagata et al. |
| 2012/0011351 A1 | 1/2012 | Mundra et al. |
| 2012/0066509 A1 | 3/2012 | Lapp et al. |
| 2012/0072723 A1 | 3/2012 | Orsini et al. |
| 2012/0110316 A1 | 5/2012 | Chamberlain et al. |
| 2012/0159159 A1 | 6/2012 | Messerges et al. |
| 2012/0159183 A1 | 6/2012 | Adams et al. |
| 2012/0166576 A1 | 6/2012 | Orsini et al. |
| 2012/0166818 A1 | 6/2012 | Orsini et al. |
| 2012/0179916 A1 | 7/2012 | Staker et al. |
| 2012/0198241 A1 | 8/2012 | O'Hare et al. |
| 2012/0204032 A1 | 8/2012 | Wilkins et al. |
| 2012/0210119 A1 | 8/2012 | Baxter et al. |
| 2012/0213360 A1 | 8/2012 | Le |
| 2012/0233472 A1 | 9/2012 | Faraboschi |
| 2012/0246489 A1 | 9/2012 | Brelot |
| 2012/0257506 A1 | 10/2012 | Bazlamacci et al. |
| 2012/0278529 A1 | 11/2012 | Hars |
| 2012/0303826 A1 | 11/2012 | Nelson |
| 2012/0324222 A1 | 12/2012 | Massey et al. |
| 2012/0331088 A1 | 12/2012 | O'Hare et al. |
| 2013/0013931 A1 | 1/2013 | O'Hare et al. |
| 2013/0034229 A1 | 2/2013 | Sauerwald |
| 2013/0054979 A1 | 2/2013 | Basmov et al. |
| 2013/0077788 A1 | 3/2013 | Blanchard et al. |
| 2013/0124852 A1 | 5/2013 | Haeger |
| 2013/0254542 A1 | 9/2013 | Buer et al. |
| 2013/0268931 A1 | 10/2013 | O'Hare et al. |
| 2013/0305039 A1 | 11/2013 | Gauda |
| 2013/0311780 A1 | 11/2013 | Besehanic |
| 2013/0326220 A1 | 12/2013 | Connelly et al. |
| 2013/0332724 A1 | 12/2013 | Walters |
| 2014/0013123 A1 | 1/2014 | Khazan et al. |
| 2014/0013452 A1 | 1/2014 | Aissi et al. |
| 2014/0068262 A1 | 3/2014 | Robertson et al. |
| 2014/0108782 A1 | 4/2014 | Salinger et al. |

(56) References Cited

U.S. PATENT DOCUMENTS

| | | |
|---|---|---|
| 2014/0108785 A1 | 4/2014 | Lindteigen et al. |
| 2014/0122866 A1 | 5/2014 | Haeger et al. |
| 2014/0143533 A1 | 5/2014 | Ganong, III et al. |
| 2014/0143538 A1 | 5/2014 | Lindteigen |
| 2014/0195793 A1 | 7/2014 | Lindteigen |
| 2014/0195798 A1 | 7/2014 | Brugger et al. |
| 2014/0229731 A1 | 8/2014 | O'Hare et al. |
| 2014/0245007 A1 | 8/2014 | Buer et al. |
| 2014/0250300 A1 | 9/2014 | Runkis et al. |
| 2014/0281526 A1 | 9/2014 | Lindteigen |
| 2014/0324698 A1 | 10/2014 | Dolcino et al. |
| 2015/0019443 A1* | 1/2015 | Sheets ............ G06Q 20/322 705/71 |
| 2015/0074409 A1 | 3/2015 | Reid et al. |
| 2015/0095645 A1 | 4/2015 | Eldar |
| 2015/0128243 A1 | 5/2015 | Roux et al. |
| 2015/0154418 A1 | 6/2015 | Redberg |
| 2015/0163229 A1 | 6/2015 | Lindteigen |
| 2015/0188893 A1 | 7/2015 | Sood |
| 2015/0222604 A1 | 8/2015 | Ylonen |
| 2015/0256518 A1 | 9/2015 | Buer et al. |
| 2015/0271151 A1 | 9/2015 | Brugger et al. |
| 2015/0363608 A1 | 12/2015 | Redberg |
| 2015/0363611 A1 | 12/2015 | Redberg |
| 2015/0381710 A1 | 12/2015 | Kish |
| 2016/0056956 A1 | 2/2016 | O'Hare |
| 2016/0219024 A1* | 7/2016 | Verzun ............ H04L 9/0662 |
| 2016/0308680 A1 | 10/2016 | Lindteigen |
| 2017/0019377 A1 | 1/2017 | Lindteigen |
| 2017/0061141 A1 | 3/2017 | Redberg |
| 2017/0075821 A1 | 3/2017 | Takahashi |
| 2017/0083725 A1 | 3/2017 | Takahashi |
| 2017/0085372 A1 | 3/2017 | Anderson et al. |
| 2017/0093587 A1 | 3/2017 | Glisson |
| 2017/0098096 A1 | 4/2017 | Redberg |
| 2017/0118180 A1 | 4/2017 | Takahashi |
| 2017/0118214 A1 | 4/2017 | Vainstein |
| 2017/0126623 A1 | 5/2017 | Lindteigen |
| 2017/0149748 A1 | 5/2017 | Lindteigen |
| 2017/0201382 A1 | 7/2017 | Lindteigen |
| 2017/0286669 A1 | 10/2017 | O'Hare et al. |
| 2017/0359317 A1 | 12/2017 | Anderson et al. |
| 2018/0041485 A1 | 2/2018 | O'Hare et al. |
| 2018/0068125 A1 | 3/2018 | Redberg |
| 2018/0082084 A1 | 3/2018 | Takahashi et al. |
| 2018/0139061 A1 | 5/2018 | Glisson |
| 2018/0176194 A1 | 6/2018 | Xiong |
| 2018/0268173 A1 | 9/2018 | Takahashi et al. |
| 2019/0050348 A1 | 2/2019 | Takahashi et al. |
| 2021/0119979 A1 | 4/2021 | Takahashi |
| 2022/0019699 A1 | 1/2022 | Takahashi |
| 2022/0174049 A1 | 6/2022 | Takahashi |
| 2022/0198069 A1 | 6/2022 | Takahashi |

FOREIGN PATENT DOCUMENTS

| | | |
|---|---|---|
| EP | 3613195 | 2/2020 |
| JP | 2005-167816 | 6/2005 |
| JP | 2012-137975 | 7/2012 |
| JP | 2014-176030 | 9/2014 |
| WO | 2017/048896 | 3/2017 |
| WO | 2017/074887 | 5/2017 |
| WO | 2018/231519 | 12/2018 |

OTHER PUBLICATIONS

Carbonite White Paper—"The Better Backup Plan, Making Sense of the Cloud"; 5 pages.

Carbonite White Paper—"The Better Backup Plan, Trouble Free Backup Solutions"; 3 pages.

Korean Intellectual Property Office; International Patent Application No. PCT/US2016/058568, International Search Report and Written Opinion, dated Jan. 20, 2017; 9 pages; Korea.

Korean Intellectual Property Office; International Patent Application No. PCT/US2016/051834, International Search Report and Written Opinion, dated Dec. 21, 2016; 11 pages; Korea.

McIvor et al. The Institute of Electronics, Communications and Information Technology (ECIT) "High-Radix Systolic Modular Multiplication on Reconfigurable Hardware." 2005. pp 13-18, 6 pages.

Nedjah, Nadia et al. State University of Rio de Janeiro, Department de Systems of Engineering and Computation. "Systolic Hardware Implementation for the Montgomery Modular Multiplication." 6 pages.

Vasyltsov et al.; Fast Digital TRNG Based on Metastable Ring Oscillator; 17 pages; Samsung Electronics; Korea.

Wikipedia; Hardware Security Module; 6 pages.

The International Bureau of WIPO; PCT International Preliminary Report on Patentability, Issued for PCT/US2016/058568; dated May 11, 2018; 5 pages; Europe.

The International Bureau of WIPO; PCT International Preliminary Report on Patentability, Issued for PCT/US2016/051834; dated Mar. 20, 2018; 9 pages; Europe.

Korean Intellectual Property Office; International Patent Application No. PCT/US2018/035052, International Search Report and Written Opinion, dated Sep. 11, 2018; 11 pages; Korea.

European Patent Office; Extended European Search Report, issued in connection to EP16847265.2; dated Feb. 11, 2019; 11 pages; Europe.

Israeli Patent Office; Office Action issued in connection to application No. 258095; dated Dec. 17, 2019; 5 pages; Israel.

The International Bureau of WIPO; PCT International Preliminary Report on Patentability, issued in connection to PCT/US2018/035052; dated Dec. 17, 2019; 9 pages; Switzerland.

Australian Government, IP Australia; Examination Report No. 1 for Standard Patent Application, issued in connection to application No. 2016323147; dated Mar. 25, 2020; 5 pages; Australia.

European Patent Office; Extended European Search Report, issued in connection to EP18816604.5; dated Mar. 18, 2020; 8 pages; Europe.

Japanese Patent Office; Office Action Summary, issued in connection to application No. 2018-534774; dated Oct. 6, 2020; 4 pages; Japan.

European Patent Office; Communication Pursuant to Article 94(3) EPC, issued in connection to application No. EP16847265.2; dated Oct. 12, 2020; 6 pages; Europe.

Menezes, A. et al.; Chapter 7: Block Ciphers ED; Handbook of Applied Cryptography; Oct. 1, 1996; 223-282 pages; CRC Press Series on Discrete Mathematics and its Applications; CRC Press.

Jang-Jaccard et al.; Portable Key Management Service for Cloud Storage; Oct. 2012; IEEE; pp. 147-156.

European Patent Office; Communication Pursuant to Article 94(3) EPC, issued in connection to application No. 18816604.5; dated Dec. 21, 2021; 6 pages; Europe.

European Patent Office; Summons to Attend Oral Proceedings Pursuant to Rule 115(1) EPC; Feb. 21, 2022; 7 pages; Europe.

Australian Government, IP Australia; Examination Report No. 1 for Standard Patent Application, issued in connection to application No. 2021201714; dated May 19, 2022; 3 pages; Australia.

Canadian Intellectual Property Office; Examiner's Report, issued in connection to application No. 2997125; dated Dec. 29, 2022; 4 pages; Canada.

European Patent Office; Communication pursuant to Article 94(3) EPC, issued in connection to application No. 18816604.5; dated Feb. 22, 2023; 6 pages; Europe.

Japanese Patent Office; Office Action Summary, issued in connection to application No. 2021-176856; dated Nov. 8, 2022; 6 pages; Japan.

Eguro, Ken; FPGAS for trusted cloud computing; 2012; IEEE; pp. 63-70.

* cited by examiner

FIGURE 5: Client and Servers Use TLS (HTTPS) Connections

FIGURE 7: Client use HTTP & Servers Use TLS (HTTPS)

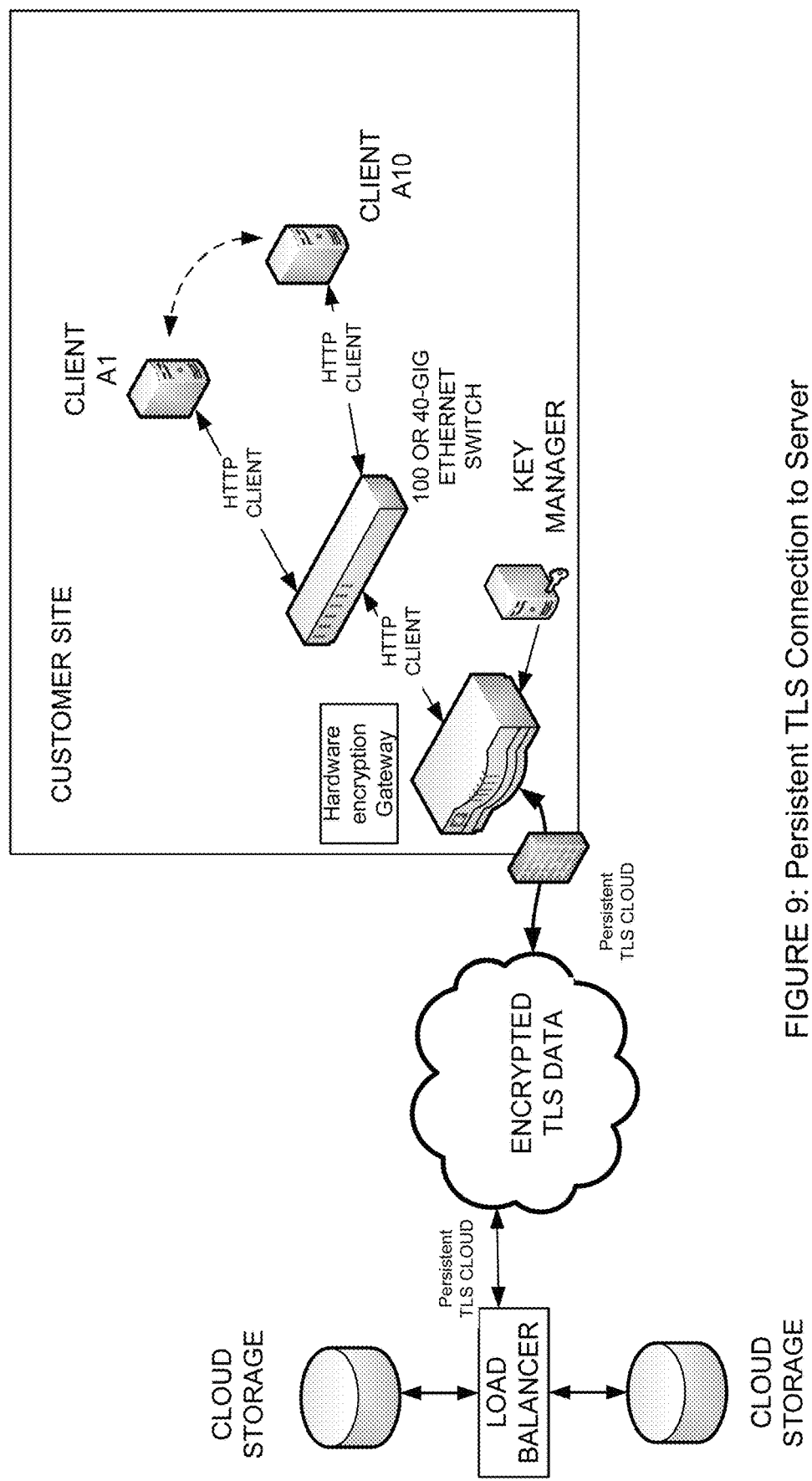
FIGURE 9: Persistent TLS Connection to Server

CLOUD STORAGE USING ENCRYPTION GATEWAY WITH CERTIFICATE AUTHORITY IDENTIFICATION

RELATED APPLICATIONS

This is a continuation application of, and claims the benefit of, U.S. application Ser. No. 15/688,743, filed Aug. 28, 2017, which is a continuation-in-part application of U.S. Non-Provisional application Ser. No. 15/264,840, filed Sep. 14, 2016, now issued as U.S. Pat. No. 9,794,064, entitled "CLIENT(S) TO CLOUD OR REMOTE SERVER SECURE DATA OR FILE OBJECT ENCRYPTION GATEWAY," by Anderson et al., which claims priority to U.S. Provisional Application Ser. No. 62/219,795, filed Sep. 17, 2015, entitled "CLIENT(S) TO CLOUD OR REMOTE SERVER SECURE DATA OR FILE OBJECT ENCRYPTION GATEWAY," by Anderson et al., the entire contents of which applications are incorporated by reference as if fully set forth herein.

U.S. application Ser. No. 15/688,743 claims priority to U.S. Provisional Application Ser. No. 62/518,117, filed Jun. 12, 2017, entitled "CERTIFICATE AUTHORITY IDENTIFICATION AND ENCRYPTION GATEWAY FOR SECURE REMOTE CLOUD STORAGE," by Anderson et al., the entire contents of which application is incorporated by reference as if fully set forth herein.

This application is related to U.S. patent application Ser. No. 14/219,651, filed Mar. 19, 2014, now issued as U.S. Pat. No. 9,374,344, entitled "SECURE END-TO-END COMMUNICATION SYSTEM," by Richard J. Takahashi, the entire contents of which application is incorporated by reference as if fully set forth herein.

This application is related to U.S. patent application Ser. No. 14/177,392, filed Feb. 11, 2014, now issued as U.S. Pat. No. 9,317,718, entitled "SECURITY DEVICE WITH PROGRAMMABLE SYSTOLIC-MATRIX CRYPTOGRAPHIC MODULE AND PROGRAMMABLE INPUT/OUTPUT INTERFACE," by Richard J. Takahashi, the entire contents of which application is incorporated by reference as if fully set forth herein.

FIELD OF THE TECHNOLOGY

At least some embodiments disclosed herein relate to security processing or storage in general.

BACKGROUND

Currently, remote cloud and server systems are protected by distributed software based encryption in which each client generates and handles cryptographic keys and encrypts its data before transmission. Distributed encryption (local client to remote server) adds extensive CPU overhead-computing to clients and allows a very wide attack vector. For example, adversaries can penetrate several clients at one time because each individual client uses a software-based encryption that insecurely stores the keys. The adversary illegally accesses (hacks) the client's machine and copies the cryptographic keys undetected. Also, the user of the client machine and the information technology network personnel are potential threats that can copy the cryptographic keys and sell/give to an adversary. A distributed encryption system with hundreds of clients increases the burden of support network personnel to protect the network from both external and internal attackers or threats. Additionally, software encryption is susceptible to malicious hacking and covert modifications.

SUMMARY OF THE DESCRIPTION

Systems and methods to send or write data or a file object to a remote cloud storage or data server using a centralized encryption gateway are described herein. Some embodiments are summarized in this section.

One embodiment replaces a distributed encryption solution for data object storage with a centralized encryption solution, which is more reliable, secure, and manageable and in many cases provides much higher performance.

In one embodiment, a centralized encryption system and centralized key manager is significantly easier to manage and protect than a distributed encryption/key manager system.

In one embodiment, a payload encryption method uses symmetric encryption algorithms with authentication to encrypt or decrypt a payload file object or data. The gateway encrypts the payload (file object or data) using a specific key associated to the client and/or object. The gateway then encrypts the payload to a remote-side transport encryption protocol and sends the encrypted payload to a remote server or cloud server.

In one embodiment, a system includes: a first computing device configured as an encryption gateway, the first computing device comprising at least one processor (e.g., for data path and/or cryptographic processing) and at least one memory, the encryption gateway configured to receive data in a payload from a client application (e.g., the client application can be implemented in either hardware or software), to encrypt the data, and to send or write the encrypted data to a remote cloud storage or a data server; a router or switch, configured to provide, via local-side transport, the payload from the client application to the encryption gateway; and a key manager, the key manager configured to provide at least one key to the encryption gateway for encryption of the data in the payload, wherein at least one key is associated to the client application (or the corresponding client) or the payload, and the encryption of the data uses a remote-side transport protocol associated with the remote cloud storage or server.

In one embodiment, a method includes: receiving, by an encryption gateway from a hardware or software client application, a request to read data from a remote cloud storage or server; receiving the data in a first payload from the remote cloud storage or server, wherein the data has been encrypted using a remote-side transport protocol associated with the remote cloud storage or data server; decrypting, by at least one processor of the encryption gateway, the received data in the first payload using the remote-side transport protocol, wherein the decrypting uses a key of the client application and the key is retrieved from a memory; encrypting, by the encryption gateway, the first payload using a client-side transport protocol; and sending, from the encryption gateway to the client application, the encrypted first payload (for a non-limiting example, see FIG. 1).

In one embodiment, an encryption gateway includes at least one processor; and memory storing instructions configured to instruct at least one processor to: receive, via local-side transport, data in a payload from a client application; receive, from a key manager, at least one key for encryption of the data in the payload, wherein at least one key is associated to the client application or the payload; encrypt the data in the payload, the encryption using a remote-side transport protocol associated with a remote cloud storage or server; and send or write the encrypted data to the remote cloud storage or server.

The disclosure includes methods and apparatuses which perform these methods, including data processing systems which perform these methods, and computer readable media containing instructions which when executed on data processing systems cause the systems to perform these methods.

In one embodiment, when connecting to the cloud or remote server, the encryption gateway uses a trusted third party to verify the identity of the cloud or remote server. In the case of Transport Layer Security (TLS) or an equivalent network or transport security protocol, this trusted third party may be a certificate authority (CA) (e.g., a computing device of the CA communicates over a network with the encryption gateway).

An example of a CA is illustrated in FIG. 2. In one embodiment, the TLS processors (e.g., the TLS blocks illustrated in FIG. 2) or TLS functions contact the CA (e.g., over the internet or a network connected to the CA) that signed a TLS peer certificate to verify that the certificate is valid. More than one certificate can be used. Once the one or more certificates are verified, the TLS connection to the client and to the cloud is established, and the client session key and cloud session key are generated per the TLS protocols. In the case that the certificate is deemed invalid, the connection is aborted and client or cloud session keys are not generated.

In one embodiment, the CA cryptographically signs a certificate that establishes the identity of the cloud or remote server. For example, the certificate is sent over the network from the computing device of the CA to the encryption gateway. The encryption gateway verifies this signature and communicates with the CA to ensure that the certificate is valid and has not been compromised.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

FIG. 9 shows persistent TLS (HTTPS) connections to server in one embodiment.

DESCRIPTION

The following description and drawings are illustrative and are not to be construed as limiting. Numerous specific details are described to provide a thorough understanding. However, in certain instances, well known or conventional details are not described in order to avoid obscuring the description. References to "one embodiment" or "an embodiment" in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Described below is a client(s) to cloud or remote server secure communication system that connects from the clients to the gateway to the cloud and/or any remote servers. In one embodiment, the data is double encrypted in transit at 10 Gigabits to 100 Gigabits/second or higher data rates.

As used herein, "HTTPS" is equivalent to HTTP over TLS or SSL (or another equivalent security).

Figure 1:
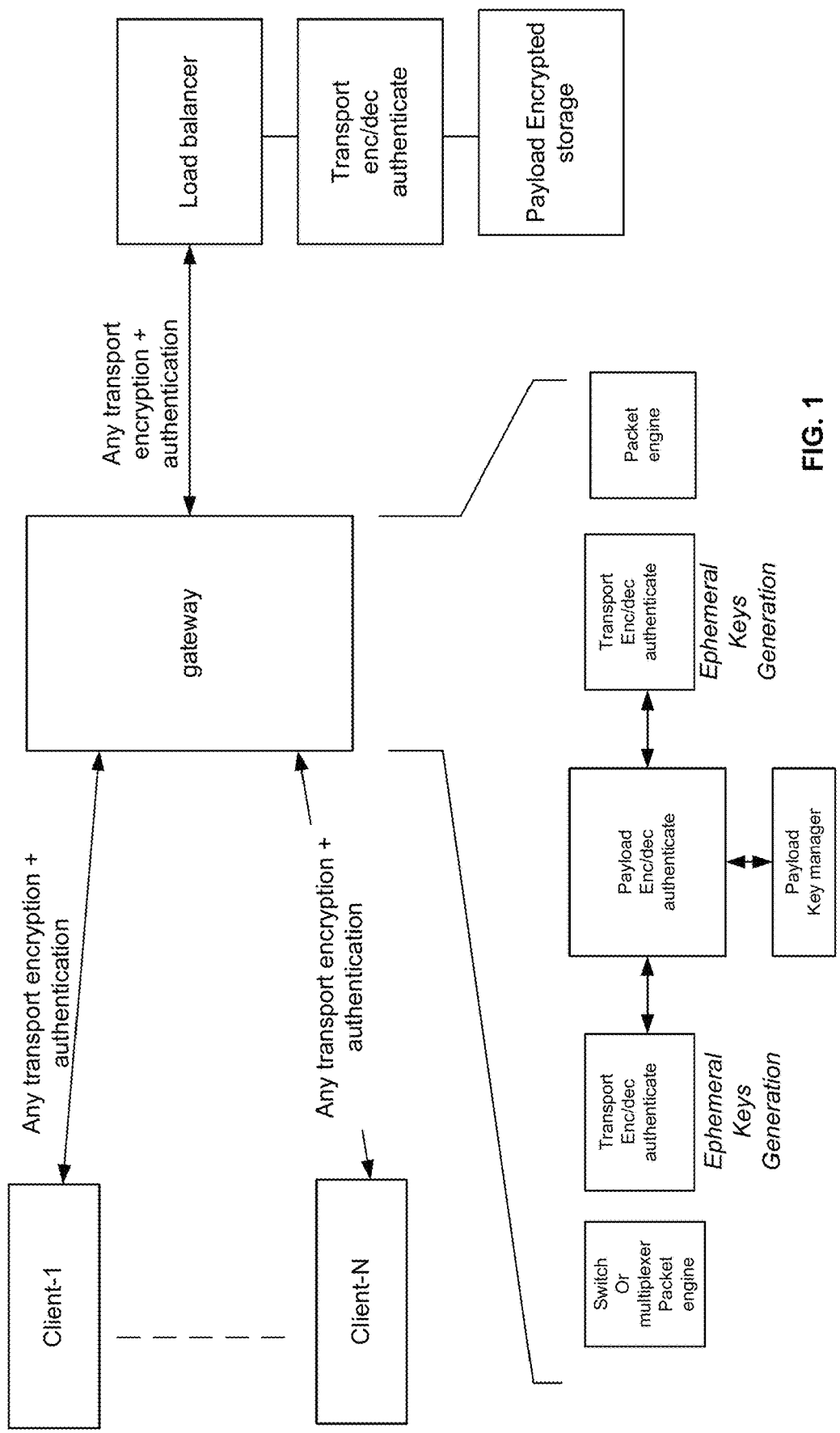
FIG. 1 shows a top level diagram of a communication system in one embodiment.
Figure 2:
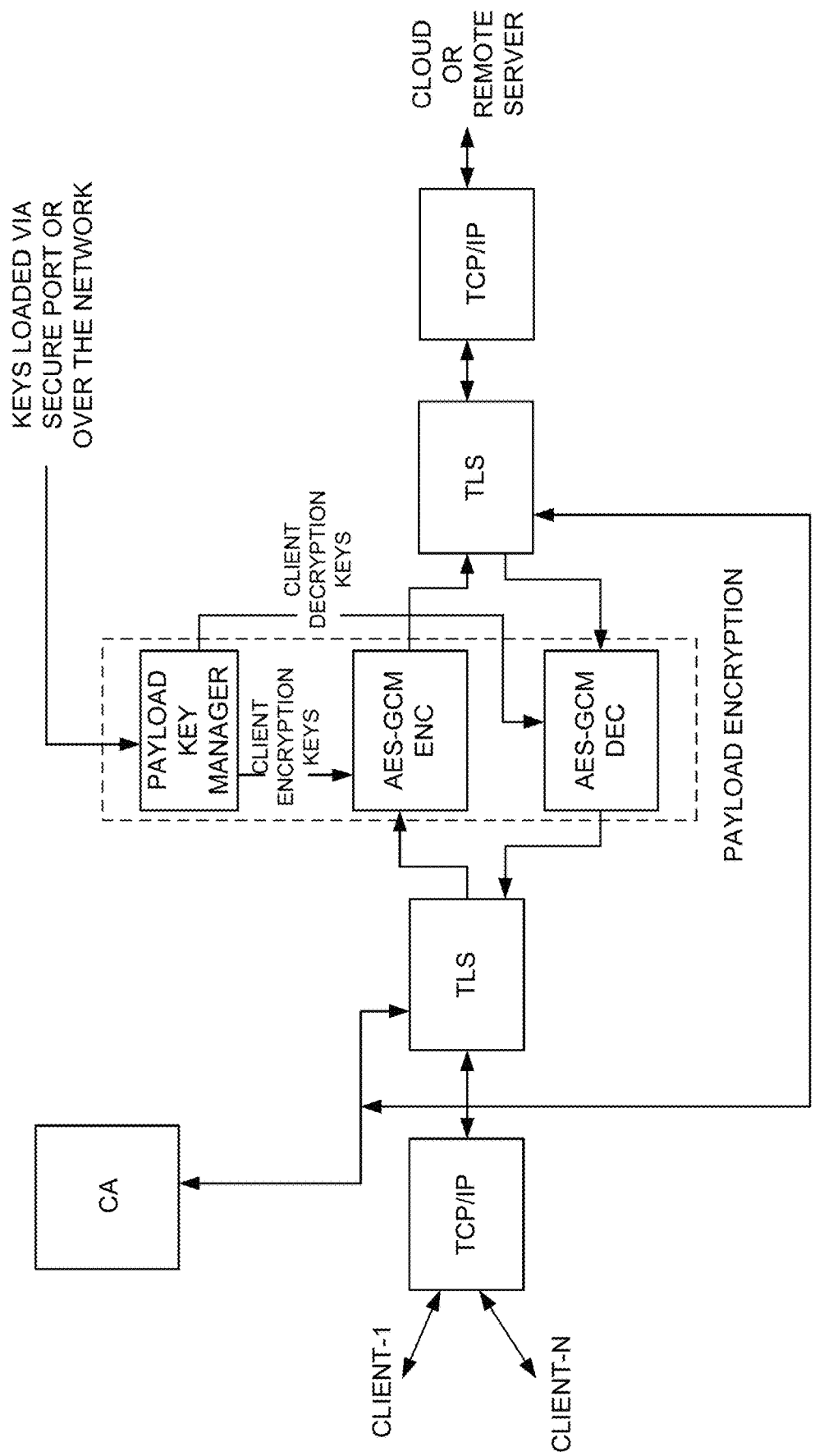
FIG. 2 shows detailed TLS (HTTPS) implementation details of one embodiment.
Figure 3:
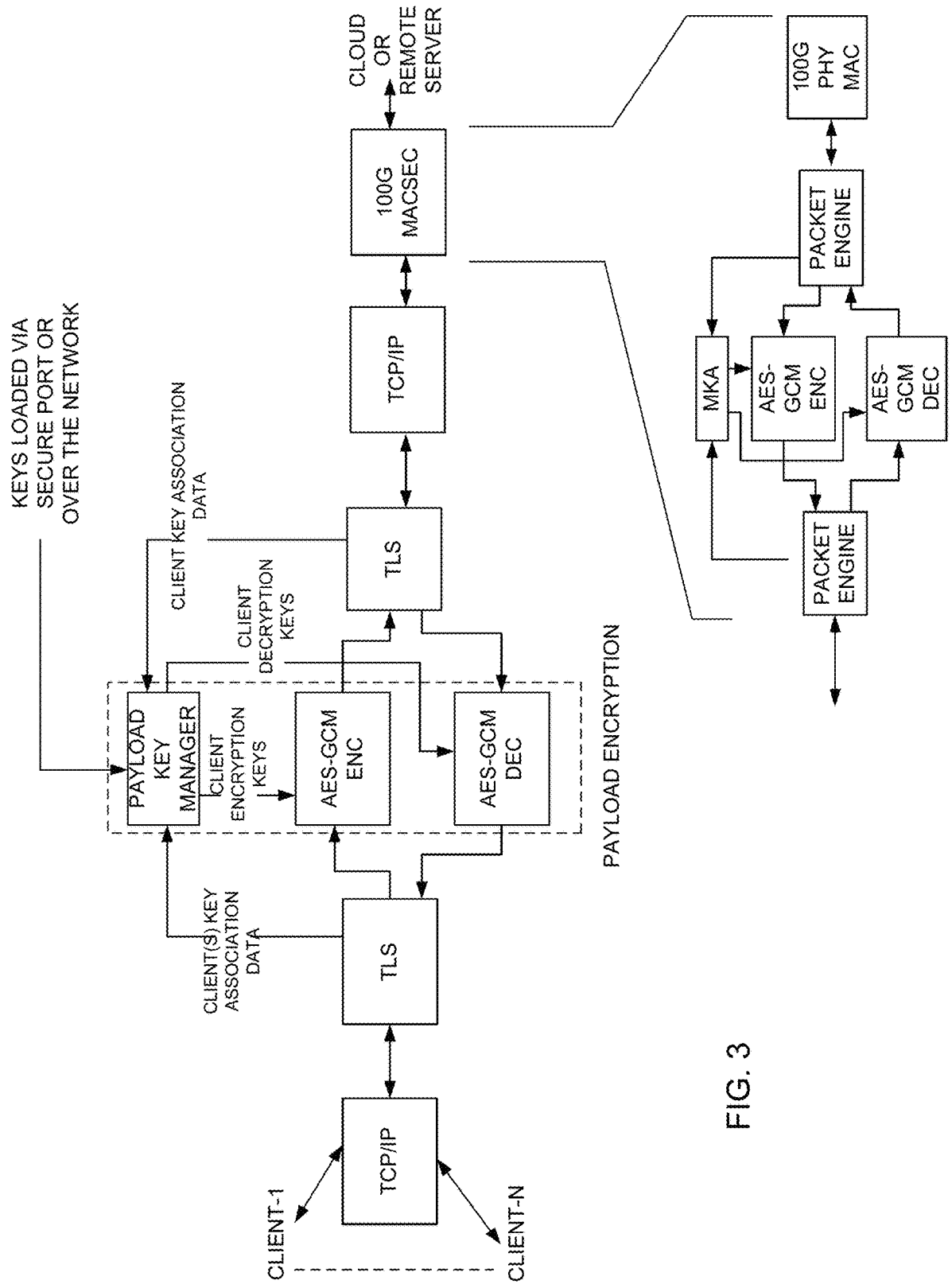
FIG. 3 shows detailed TLS (HTTPS)/MACSEC implementation details of one embodiment.
Figure 4:
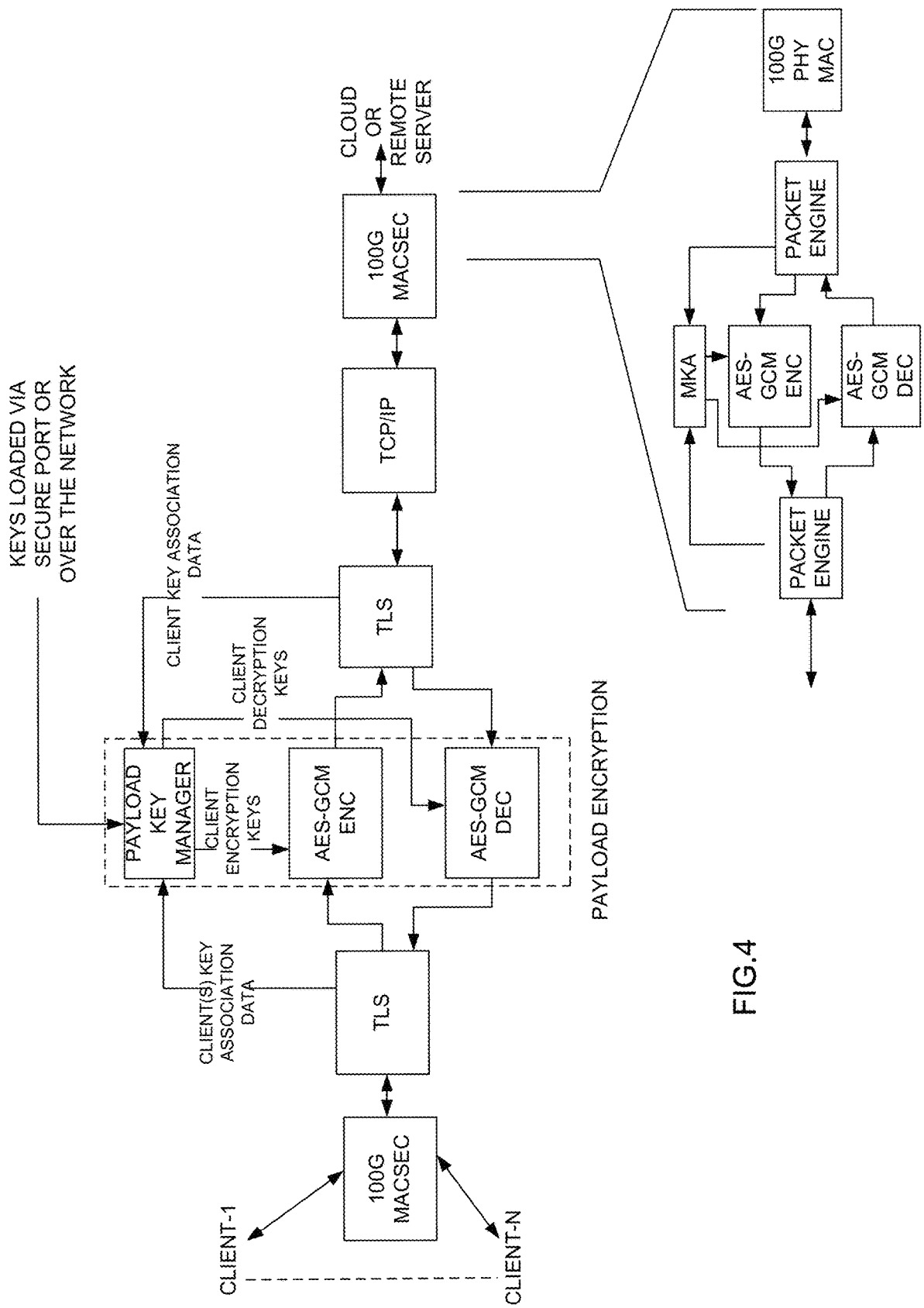
FIG. 4 shows detailed MACSEC implementation details of one embodiment.

FIGS. 1-4 show example embodiments of the communication system. FIG. 1 illustrates an example of the communication system in situ. FIG. 2 illustrates an embodiment of the system with TLS transport security on both local and remote sides of the system. FIG. 3 illustrates an embodiment of the system with TLS transport security on local side and MACSEC transport security on the remote side of the system. FIG. 4 illustrates an embodiment of the system with MACSEC transport security on both local and remote sides of the system.

In some embodiments, as illustrated in FIGS. 3 and 4, MACSEC security is used. MACSEC is described by the IEEE 802.1AE-2006 standard (currently with 3 amendments, IEEE 802.1AEbn-2011, IEEE 802.1AEbw-2013, IEEE 802.1AEcg-2017). The MAC security standard (also known as "MACsec") defines connectionless data confidentiality and integrity for media access independent protocols over an OSI layer two network. The MACsec Key Agreement ("MKA") protocol is responsible for maintaining MACsec connections by generating and providing cryptographic keys to be used for each MACSEC connection. The optional addition of MACSEC adds another layer of transport encryption for cloud-based encryption to completely hide all information being transmitted. Without MACSEC, the TLS encryption still keeps certain data fields in the clear (this is needed information for the TLS protocol to operate). By adding MACSEC security, all of the information transmitted is completed encrypted. Also, in alternative embodiments, MACSEC can be used to provide transport encryption instead of TLS.

Data Flow

In one embodiment, a local client sends or writes data to the cloud or remote server flow. The client uses any transport encryption method on the file object or data to the gateway. The gateway decrypts the local-side transport to yield the plain text file object or data. The gateway encrypts the payload (file object or data) using a specific key associated to the client and/or object. The gateway then encrypts the payload to the remote-side transport encryption protocol and sends to the remote server or cloud server. The remote server or cloud server decrypts the transport protocol. At this time, the payload is still encrypted by the client's key. The encrypted payload data is then stored. The aggregated gateway terminates local side communication (e.g., MACSEC, IPSEC, TLS), performs encryption as required on the TCP stream of data (e.g., encrypt a file object in a file transfer stream), and then performs new independent transport encryption (e.g., TCP and TLS sessions) on the remote side.

In one embodiment, data is read or the local client receives data from the cloud or remote server. The client requests that the remote server or cloud server reads the encrypted stored data. The remote server or cloud server encrypts the data using remote-side transport protocol. The gateway receives the data and decrypts the remote-side transport protocol. Next, using the client's key, the gateway decrypts the payload file object or data and then encrypts the file object or data using the client-side transport protocol. The client receives the transport data and decrypts. The aggregated gateway terminates remote side communication (e.g., TCP and TLS sessions), performs decryption as required on the TCP stream of data (e.g., encrypt a file object in a file transfer stream), and then performs new independent transport encryption (e.g., MACSEC, IPSEC, TLS) on the local side.

Transport Encryption

In one embodiment, the transport encryption method is used to protect the data during transmission between physical sites or buildings (i.e., point-to-point encryption). The transport encryption method can be, for example, an industry standard such as, for example, TLS (Transport Security Layer), IPSec (Internet Protocol Security), MACSEC (IEEE MAC Security standard), or any custom transport protocol. In one embodiment, TLS, MACSEC, and IPSec each have authentication information that will be used to associate the client's payload keys. A Transport Layer Security (TLS) or equivalent network or transport security protocol may communicate to a third party certificate authority (CA) for certificate(s) set-ups and to verify the identity of the cloud or remote server or users.

Payload Encryption

In one embodiment, the payload encryption method uses symmetric encryption algorithms with authentication (e.g., AES-GCM) to encrypt or decrypt the payload file object or data. In alternative embodiments, other encryption algorithms can be used, such as an asymmetric algorithm. Payload encryption protects the file or object data while it is stored in cloud storage or at the cloud or remote server. Adding authentication ensures that the data has not been manipulated in any way while it has been stored. In addition, the payload encryption provides additional security above and beyond the transport encryption while the data is in transport. Encryption while the data is stored ensures that only the client can access the data. Other entities, such as the storage provider, cannot access, for example, the plaintext data because they do not have keys for that data.

In one embodiment, the symmetric encryption algorithm with authentication is required to associate the proper client's payload key to the file object or data. The payload key manager facilitates the loading of client payload keys into the gateway. The client keys can be either loaded via a secure port or over the network using a secure method. Once the keys are loaded into the gateway, the keys are pre-associated to the clients that are connected to the gateway. The client's key is associated to the client based on the information provided by the transport encryption method. Once the client keys are loaded into the gateway, the client's keys cannot be read or exposed.

The payload key manager (e.g., illustrated in FIG. 2) communicates with a payload encryption protocol to determine who the client is and what client payload key to associate with the file object or data for payload encryption or decryption. One of the features is the ability to encrypt the payload data at the file object level and associate the client's payload key to the file object.

Some advantages for various embodiments of the above: Implementing this disclosure in hardware using FPGAs or ASIC for, for example, 10 Gigabits to 100 Gigabits/second or higher data rates provides reliability against external attacks on the encryption system. Centralized encryption simplifies user management of site-wide data encryption. High-rate encryption enables remote storage without detriment to user experience. In one embodiment, a cipher or encryption algorithm for the foregoing can be implemented using a systolic matrix architecture as referred to below.

Additional Encryption Gateway Embodiments

In one embodiment, a first computing device is configured as an encryption gateway, and the first computing device comprises at least one processor (e.g., for data path and/or cryptographic processing) and at least one memory. The encryption gateway is configured to authenticate a client using one or multiple authentication factors, and further configured to receive TLS (or other transport encryption) data from a client application. The encryption gateway will terminate the client TLS connection and extract the payload and encrypt the payload with authentication. Authentication is used in addition to the encryption algorithm to authenticate the data. The authentication process verifies the data originated from the intended source. For example, AES-GCM is an encryption algorithm that includes authentication performed prior to and after an encryption process. This authentication verifies the data that was encrypted or decrypted did originate to/from an authorized source or user. The payload is encrypted using the object/file key (e.g., see "File object derived key" in FIG. 6). This encryption protects the data while it is stored. The payload is also authenticated so that when the object/file is read from the data store, the gateway can determine if the data was modified in any way including, for example, being tampered with.

Next, the encryption gateway inserts the encrypted-authenticated payload into the cloud or data server TLS data packet/format. The encryption gateway establishes a cloud or data server TLS connection. The cloud or data server terminates the TLS connection, which includes TCP termination, and stores the encrypted-authenticated payload in the cloud or data server memory.

In one embodiment, an approach terminates a client TLS connection which also includes TCP termination, extracts data from a payload and encrypts the extracted data with authentication (using an encryption key from a key manager). A TLS connection is set-up to a cloud or data server, and the encrypted authenticated data is inserted into a TLS cloud payload with key association information. The cloud or data server terminates the TLS connection and the encrypted authenticated payload data is stored on the cloud or data server memory/storage.

This section below describes embodiments regarding a design of a, for example, 100 Gbps (gigabit per second)-full duplex link that uses both data-at-rest encryption and full TLS transport security. The design is not limited to TLS and Cloud Services file encryption, and this description is an example and discussion of the tradeoffs of a single embodiment of the general design. In one embodiment, the TLS algorithm can be implemented using a systolic matrix architecture as referred to below.

TLS background (used in this example) and other transport encryption methods are, for example, IPSEC, MACSEC, or a custom method. In one embodiment, the transport and packet processing can be implemented using a systolic matrix architecture as referred to below.

In one embodiment, Transport Layer Security (TLS) or Secure Socket Layer (SSL) is used to secure data in flight at Layer 6 of the OSI model. It provides both certificate authentication and transport encryption for all application layer data. Certificate authentication is achieved by verifying the CA's cryptographic signature covering the certificate, and/or contacting the CA to ensure that the certificate in question is currently valid. In the context of remote cloud storage, TLS gives the client confidence that its data is only connected to the cloud service provider.

TLS operates by negotiating a session key per TLS or Secure Socket Layer (SSL) connection. A single TLS connection is not a burden, but as the number of TLS connections that are negotiated within a device increases, the connections become increasingly burdensome in both computational requirements and real-time delay.

In-Line Encryption

Option 1: Clients and Servers Use HTTPS Connections

Figure 5:
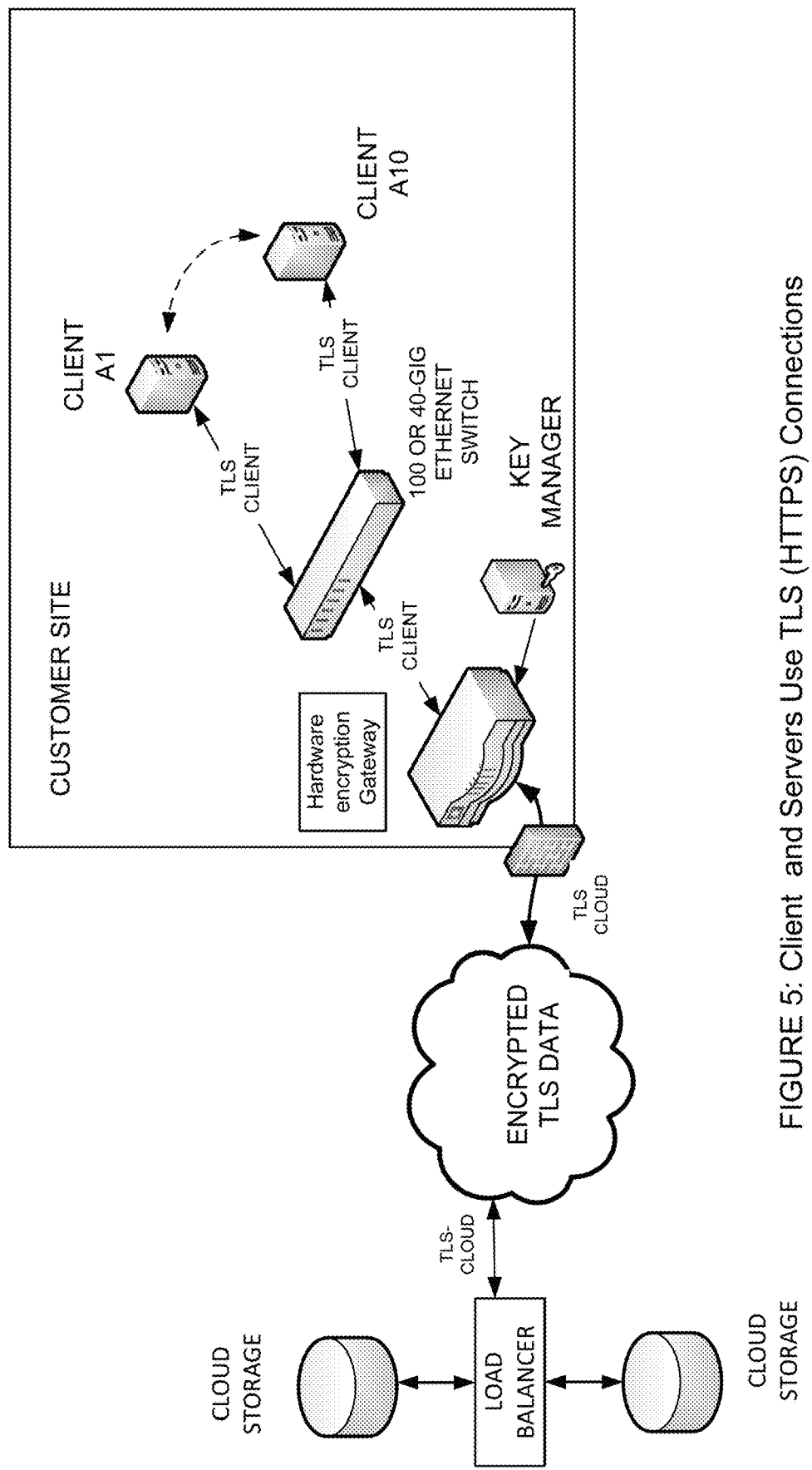
FIG. 5 shows clients and servers using TLS (HTTPS) connections in one embodiment.

In order to encrypt the HTTP information in-line, the hardware encryption gateway acts as a TLS proxy between client applications and cloud storage as shown in FIG. 5.

Figure 6:
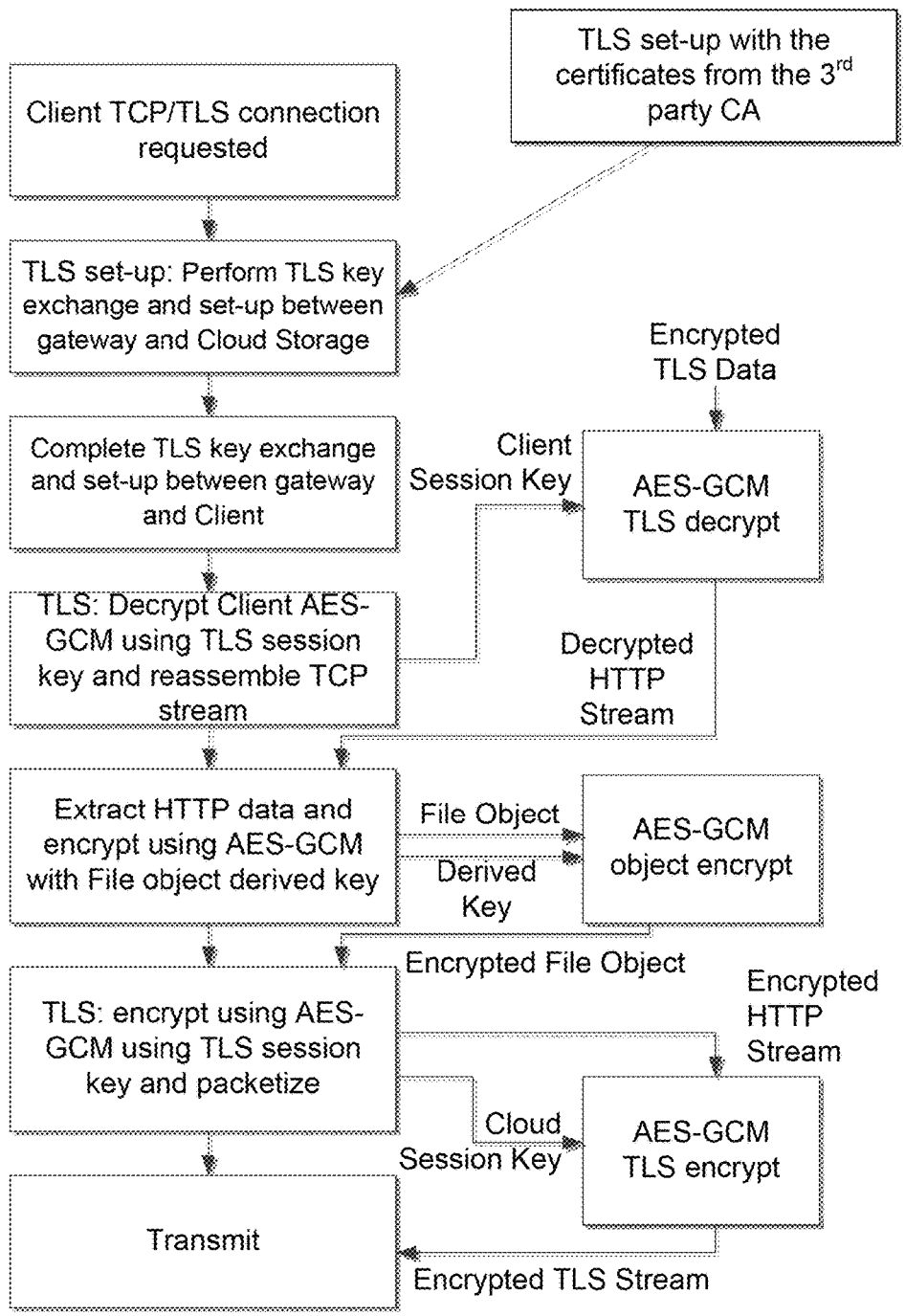
FIG. 6 shows a TLS (HTTPS) proxy data flow in one embodiment.

FIG. 6 shows a flow chart describing the process of decrypting and re-encrypting the TLS connections.

The encryption gateway negotiates a TLS connection to the client and a TLS connection to the cloud server. In one embodiment, part of this negotiation includes exchange of signed certificates. Typically, the gateway provides a certificate to the client, verifying the gateway's identity (but the client does not need to prove its identity to the gateway or the remote server). So, a certificate is not necessarily received by the gateway from the client.

In alternative embodiments, the TLS exchange may start by or include the gateway receiving a certificate from the client. For example, TLS exchanges can implement (and TLS allows for) clients to provide the gateway with a certificate.

The TLS endpoint contacts the CA to verify that the received certificate is valid. In one embodiment, there are two independent TLS exchanges and connections that take place: one TLS exchange between the client and gateway, and another TLS exchange between the server and gateway. So, the gateway provides two TLS endpoints, one on the cloud server side, and one on the client side.

If the CA does not indicate that the certificate is valid, the negotiation is aborted. If the CA indicates the certificate is valid, the TLS protocol will establish the session key and encrypt the data with the session key and transmit the encrypted data to the client and/or cloud server, thus establishing a secure connection.

Before encrypting the file object for data-at-rest, the client TLS encryption will be decrypted using the client session key. In one embodiment, the HTTP data of FIG. 6 contains a file header, which contains information that is used to create the payload encryption key, which is derived using a key encryption key (KEK). For example, the "Derived key" shown in FIG. 6 is the payload encryption key. The file header information stays with the file/object while it is stored and will be available when the file/object is read. When the file/object is read, the file header information is then used to derive the same key (using the KEK) to decrypt the data.

In one embodiment, the file header information is prepended to the file/object. It is not encrypted and provides information which allows the gateway to derive the payload encryption key.

The file object will be encrypted using a key derived from the file object metadata (e.g., an Object ID). After encrypting the file object, the HTTP stream will be TLS encrypted for transport to the cloud server using the cloud session key.

This "Option 1" approach allows both cloud servers and client applications to continue operating transparently, provided the proxy (Hardware Encryption Gateway) is able to provide a valid cloud certificate to the client. In one embodiment, the cloud server provides the gateway with a signed certificate. The gateway must present a separate certificate, optionally signed by a different signing authority. In one embodiment, the proxy cloud certificate is signed by a CA that is trusted by the client so that the client trusts the proxy certificate that is present in place of the original cloud server certificate.

There are two basic CA types: an actual third party CA or a private CA created by the client. Either type is acceptable as long as the CA is trusted by the client and/or cloud server.

If the proxy does not have a valid certificate for the cloud domain, the clients would need to accept the proxy certificate as a security exception.

The cost of Hardware Encryption Gateway using TLS for both the client and the cloud server is that the number of TLS negotiations required has doubled compared to not using a proxy. This can reduce throughput performance for clients due to added TLS negotiation time, especially for small-sized files. This also puts a heavy burden on the proxy (Hardware Encryption Gateway) because it must deal with the aggregate client TLS sessions.

Option 2: Clients Use HTTP, Cloud Storage Uses HTTPS

Figure 7:
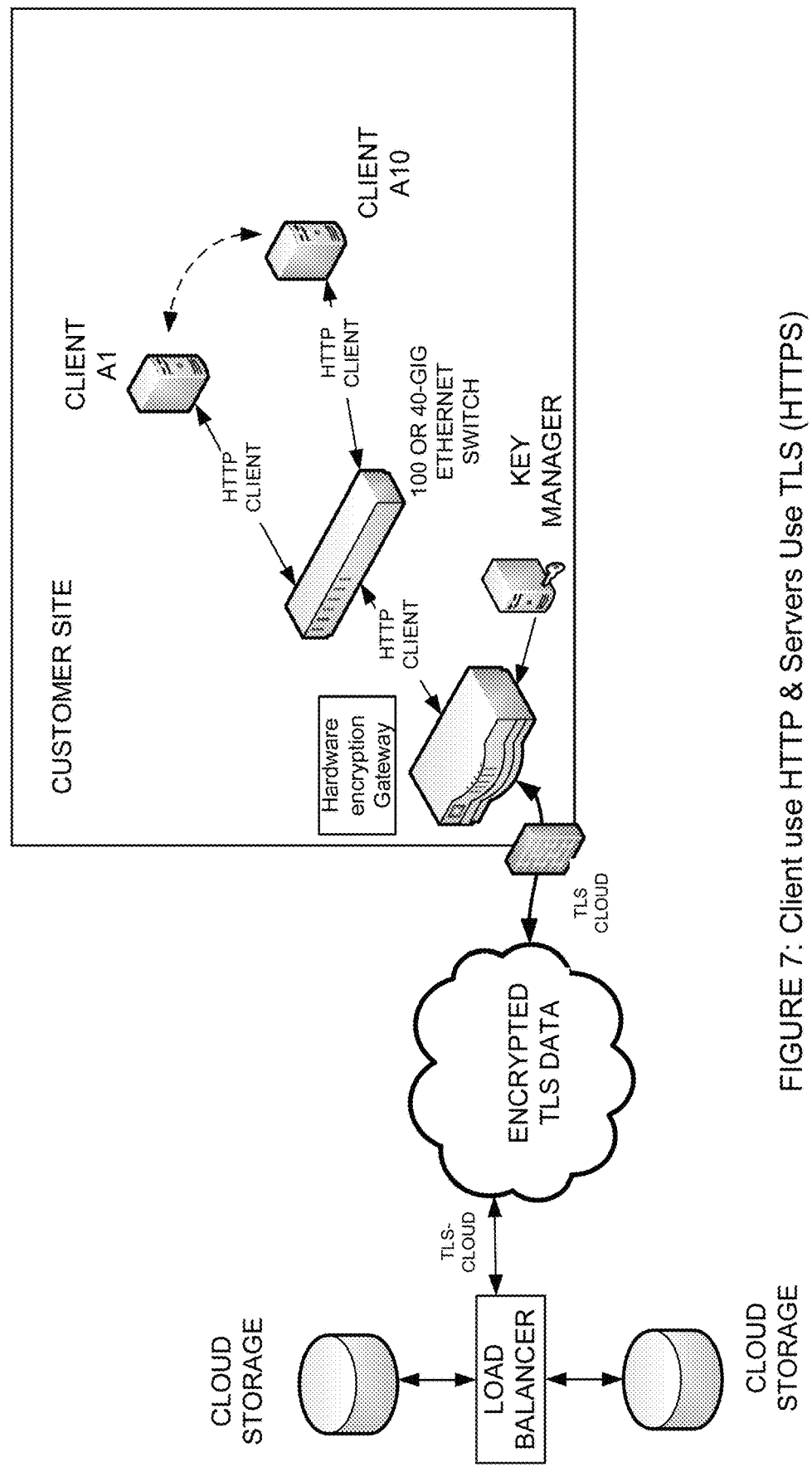
FIG. 7 shows clients using HTTP and server using TLS (HTTPS) in one embodiment.

In order to reduce the performance impact of the insertion of the TLS proxy (Hardware Encryption Gateway) and ease the burden on the proxy, we can attempt to reduce the number of TLS connections in the system. One way of doing this is to modify the client connection to use an unencrypted HTTP connection. Because all client-to-proxy connections are contained within the customer site, this is a low risk change to the internal network security as shown in FIG. 7.

Because the clients are modified to communicate using HTTP only, Hardware Encryption Gateway would act as a client-only TLS proxy. Hardware Encryption Gateway will modify the client HTTP packets to the HTTPS. This will reduce the number of TLS negotiations in half from the full HTTPS option, and will remove a level of decryption in client-to-proxy traffic and a level of encryption in the proxy-to-client traffic, relieving both client and proxy of that computational burden. Note that this solution may require a change to the client side software.

Figure 8:
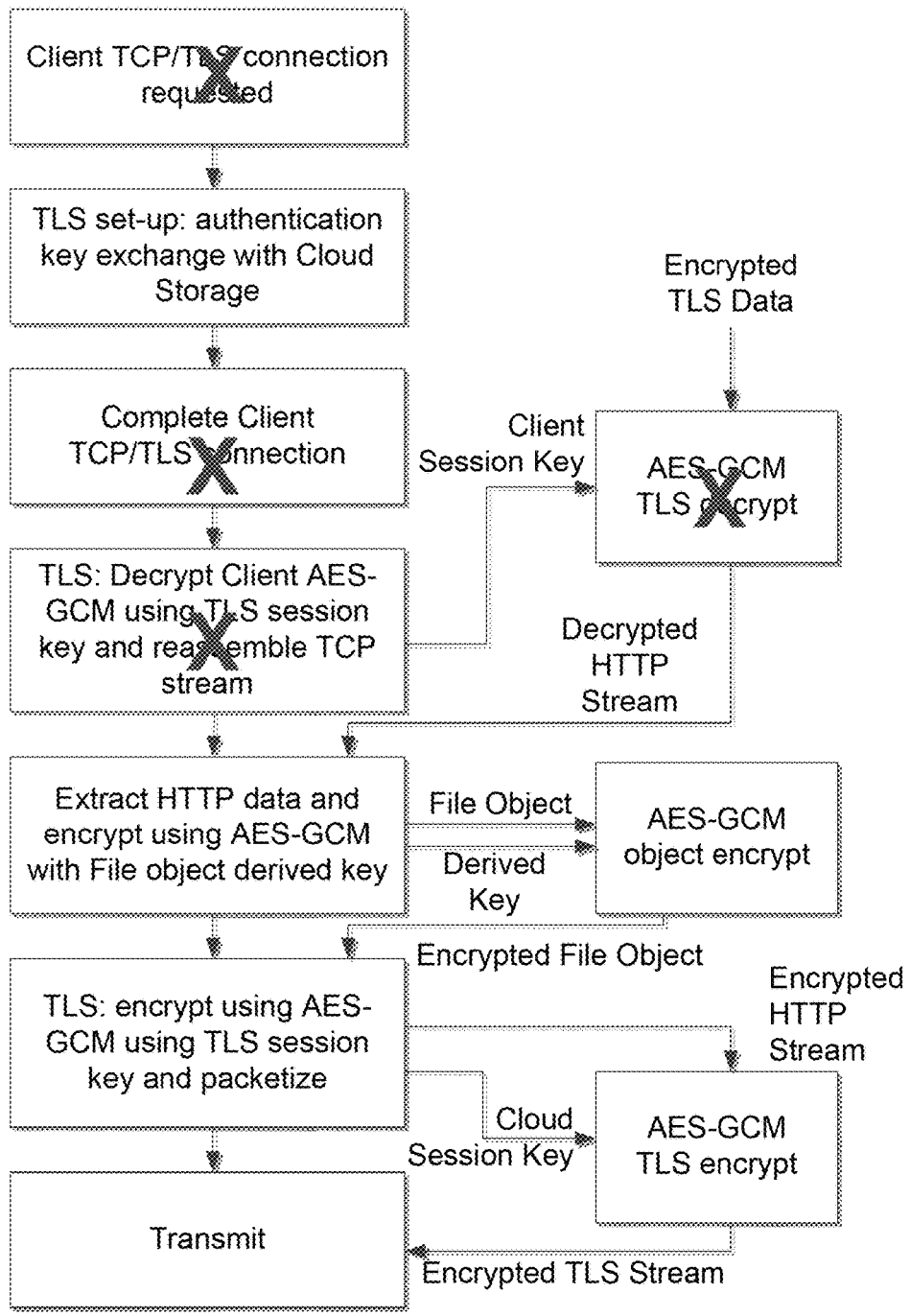
FIG. 8 shows HTTP client to TLS (HTTPS) server proxy connection data flow in one embodiment.

An illustration of the steps saved by removing encryption to the client is in FIG. 8.

Option 3: Proxy to Server Optimization

Option 3 outlines potential performance optimizations that could reduce the number of TLS negotiations that are needed between cloud server and proxy from the direct-connect HTTPS network used in both Options 1 and 2. In this optimization, the TLS proxy (Hardware Encryption Gateway) opens and maintains persistent TLS connections to the cloud servers and tunnels the various client connections through those tunnels as shown in FIG. 9.

Hardware Encryption Gateway would set up TLS sessions with a cloud server before clients initiate any data transfer. As clients move data to/from the cloud servers, Hardware Encryption Gateway would use a pre-opened TLS session for the client, modifying the client IP address and port number to that of the active TLS session.

In addition, for client-to-server traffic, Hardware Encryption Gateway would insert a TLS header, modify the server TCP port number to HTTPS, and perform all the necessary TLS encryption and authentication. For server-to-client traffic, Hardware Encryption Gateway would reverse the process described above. In one embodiment, there is a need to determine the duration the TLS sessions can be kept alive before the link would need to be renegotiated, as well as on potential impact on the cloud Load Balancers.

This option can be used in combination with either Option 1 or Option 2. In either case, it would reduce the number of proxy-to-server TLS sessions required especially in the case of many short-lived client connections. This option also disassociates the lag of proxy-to-server connections from the client-to-proxy connections so that the client does not see additional latency in individual client connections.

In various embodiments, a general hardware aggregated encryption gateway (as discussed above) enables centralized encryption of communications leaving a corporate or other site. In one embodiment, the above Hardware Encryption Gateway can negotiate hundreds of TLS connections per second and maintain thousands of TCP connections simultaneously. In one embodiment, the Hardware Encryption Gateway is programmable for real-time HTTP 100 Gbps full duplex TLS and data at rest encryption that is transparent to clients and the cloud.

In some embodiments, the encryption gateway may be implemented by or use encryption/decryption and/or communication methods and systems as described in U.S. patent application Ser. No. 14/177,392, filed Feb. 11, 2014, entitled "SECURITY DEVICE WITH PROGRAMMABLE SYSTOLIC-MATRIX CRYPTOGRAPHIC MODULE AND PROGRAMMABLE INPUT/OUTPUT INTERFACE," by Richard J. Takahashi, and/or as described in U.S. patent application Ser. No. 14/219,651, filed Mar. 19, 2014, entitled "SECURE END-TO-END COMMUNICATION SYSTEM," by Richard J. Takahashi. For example, the encryption gateway may use systolic matrix packet engines and multiplexers to process and route packets or other data, as described in the foregoing applications.

In one embodiment, data transmitted from a client to a remote cloud storage or server for storage is encrypted using three different keys, described in more detail as follows. The first key (key-1) is set-up with, for example, TLS encryption from the client application to the encryption gateway. The second key is the payload encryption key (key-2) used to encrypt the payload data (e.g., a file, or one or more file objects). The third key (key-3) is used for the TLS encryption from the encryption gateway to the remote cloud storage or server.

In this embodiment, key-1 is used to decrypt data from the client that is received at the gateway, and key-3 is used to encrypt data that is sent to the cloud. Also, key-1 is used as the TLS client session key. Data is only protected by key-1 for the duration of the transport between the client and the gateway. Key-3 is used similarly for the duration of the transport between the gateway and the remote cloud storage or server.

In one embodiment, data is encrypted by the encryption gateway at a file or file object level, and at least one key is associated to a file object. Examples of an executable file include a complete program that can be run directly by an operating system (e.g., in conjunction with shared libraries and system calls). The file generally contains a table of contents, a number of code blocks and data blocks, ancillary data such as the memory addresses at which different blocks should be loaded, which shared libraries are needed, the entry point address, and sometimes a symbol table for debugging. An operating system can run an executable file by loading blocks of code and data into memory at the indicated addresses and jumping to it.

Examples of a file object include code that is logically divided into multiple source files. Each source file is compiled independently into a corresponding object file of partially-formed machine code known as object code. At a later time these object files are linked together to form an executable file. Object files have several features in common with executable files (table of contents, blocks of machine instructions and data, and debugging information). However, the code is not ready to run. For example, it has incomplete references to subroutines outside itself, and as such, many of the machine instructions have only placeholder addresses.

In one embodiment, the encryption gateway sets up a transport session with the remote cloud storage or server prior to receiving the payload from the client (e.g., from an application executing on the client), and the encryption gateway uses the transport session for sending or writing data from a plurality of client applications, including the client application, to the remote cloud storage or server.

In one embodiment, the encryption gateway modifies or inserts a header in a transport connection to associate the client application on a remote connection, or the encryption gateway modifies or inserts a header in a file object to associate the client application on a remote connection.

In one embodiment, the client application can be software that transfers the file or file object to the gateway. In one embodiment, the header is an HTTP packet header that contains the information related to the packet, where the gateway can modify or insert information without disturbing or disrupting the original function of the HTTP packet.

In one embodiment, the data received from the client comprises a payload having a plurality of file objects, and the payload key is associated to each of the file objects. The payload key can be derived using metadata or file header information, as was described above. In either case, the metadata or file header contains information that is used to derive the payload cipher key with a KEK. The metadata or file header is maintained with the file/object for the life of the file/object so that it can be used at any time to derive the payload cipher key to decrypt the file/object (e.g., when it is read from remote cloud storage).

In one embodiment, the data received from the client comprises packets including a first packet, and a header is inserted into one or more of the packets (e.g., the first packet), wherein the header associates each packet to the client. The file object may be split among multiple packets. In the first packet of a file, identifying information is stored that is used to extract the correct key for decryption when the file is later read (this provides key association with the data). This identifying information can be in the form of an additional header prepended to the file, or by modifying existing metadata. The inserted file header is a new header. If metadata is modified, new metadata is inserted in an existing header. In this embodiment, there is no association between the file header or metadata with the remote connection. Internally, the contents of the header/metadata of the first packet of the file creates a context that associates subsequent packets with the first packet.

In one embodiment, the payload key is associated to the client or an object in the data received from the client. The payload key association is made through an identifying feature of the cloud server protocol associated with the cloud or remote server. In Amazon Web Services (AWS), for example, a specific "bucket" (e.g., like a folder) can have a key associated with it. The key to use is identified based on that information and uses that association.

In one embodiment, the gateway receives authentication information from the client to request the local side TLS key using the TLS protocol.

In one embodiment, the gateway communicates with the remote-side transport protocol to determine the remote side TLS key for use in encryption. The TLS protocol is used to determine the key.

In one embodiment, the client session key is an ephemeral key generated after receiving, by the gateway, a request from the client to establish a connection. The cloud session key is an ephemeral key generated after receiving a request from the gateway to the cloud server to establish a connection. Both the client session and cloud session keys are generated in response to a request to the gateway for connection from the client.

In one embodiment, the gateway modifies or inserts a header in at least one of a plurality of packets received from the client to associate the client to a file object (e.g., the header is only inserted in a first packet of a multi-packet file/object).

Closing

At least some aspects disclosed can be embodied, at least in part, in software. That is, the techniques may be carried out in a computer system or other data processing system in response to its processor(s), such as a microprocessor, executing sequences of instructions contained in a memory, such as ROM, volatile RAM, non-volatile memory, cache or a remote storage device.

In various embodiments, hardwired circuitry (e.g., one or more hardware processors or other computing devices) may be used in combination with software instructions to implement the techniques above (e.g., the communication system may be implemented using one or more computing devices). Thus, the techniques are neither limited to any specific combination of hardware circuitry and software nor to any particular source for the instructions executed by the data processing system.

In one embodiment, a computing device may be used that comprises an inter-connect (e.g., bus and system core logic), which interconnects a microprocessor(s) and a memory. The microprocessor is coupled to cache memory in one example.

The inter-connect interconnects the microprocessor(s) and the memory together and also interconnects them to a display controller and display device and to peripheral devices such as input/output (I/O) devices through an input/output controller(s). Typical I/O devices include mice, keyboards, modems, network interfaces, printers, scanners, video cameras and other devices which are well known in the art.

The inter-connect may include one or more buses connected to one another through various bridges, controllers and/or adapters. In one embodiment the I/O controller includes a USB (Universal Serial Bus) adapter for controlling USB peripherals, and/or an IEEE-1394 bus adapter for controlling IEEE-1394 peripherals.

The memory may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, a data processing system such as the computing device above is used to implement one or more of the following: an encryption gateway, a router, a switch, a key manager, a client application, cloud storage, a load balancer, and a firewall.

In one embodiment, a data processing system such as the computing device above is used to implement a user terminal, which may provide a user interface for control of a computing device. For example, a user interface may permit configuration of the encryption gateway. A user terminal may be in the form of a personal digital assistant (PDA), a cellular phone or other mobile device, a notebook computer or a personal desktop computer.

In some embodiments, one or more servers of the data processing system can be replaced with the service of a peer to peer network of a plurality of data processing systems, or a network of distributed computing systems. The peer to peer network, or a distributed computing system, can be collectively viewed as a server data processing system.

Embodiments of the disclosure can be implemented via the microprocessor(s) and/or the memory above. For example, the functionalities described can be partially implemented via hardware logic in the microprocessor(s) and partially using the instructions stored in the memory. Some embodiments are implemented using the microprocessor(s) without additional instructions stored in the memory. Some embodiments are implemented using the instructions stored in the memory for execution by one or more general purpose microprocessor(s). Thus, the disclosure is not limited to a specific configuration of hardware and/or software.

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using an Application-Specific Integrated Circuit (ASIC) or a Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Hardware and/or software may be used to implement the embodiments above. The software may be a sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

Software used in an embodiment may be stored in a machine readable medium. The executable software, when executed by a data processing system, causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

In general, a tangible machine readable medium includes any mechanism that provides (e.g., stores) information in a form accessible by a machine (e.g., a computer, network device, personal digital assistant, manufacturing tool, any device with a set of one or more processors, etc.).

Although some of the drawings may illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that various stages or components could be implemented in hardware, firmware, software or any combination thereof.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure.

No claim element herein is to be construed under the provisions of 35 U.S.C. 112, sixth paragraph, unless the element is expressly recited using the phrase "means for."

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method for securely transmitting data between a client and a cloud storage or server through a gateway, the method comprising:
    receiving, by the gateway, first data from the client, the first data including an unencrypted portion and an encrypted portion;
    decrypting, by the gateway, the encrypted portion using a first transport protocol to provide first decrypted data;
    deriving, by the gateway, a first key stored in the gateway from the unencrypted portion;
    encrypting, by the gateway using the first key, the first decrypted data to provide first encrypted data;
    encrypting, by the gateway using a second transport protocol, the first encrypted data to provide second encrypted data; and
    sending, by the gateway, the second encrypted data to the cloud storage or server.

2. The method of claim 1, further comprising loading the first key into the gateway and pre-associating the first key with the client.

3. The method of claim 1, wherein the encrypted portion is encrypted using a symmetric encryption algorithm and the unencrypted portion includes file header information to be used by the gateway to derive the first key.

4. The method of claim 1, wherein the first or second transport protocol uses Transport Layer Security (TLS), Internet Protocol Security (IPSec), or IEEE MAC Security (MACSEC).

5. The method of claim 1, further comprising authenticating, by the gateway, the client using one or more authentication factors before receiving the first data from the client.

6. The method of claim 1, further comprising establishing a secure connection between the gateway and the client for transmitting the first data after the gateway receives a connection request from the client.

7. The method of claim 6, wherein the establishing includes providing, by the gateway, a certificate to the client verifying an identity of the gateway.

8. The method of claim 6, wherein the establishing includes receiving, by the gateway, a certificate from the client verifying an identity of the client.

9. The method of claim 6, further comprising terminating, by the gateway, the secure connection after receiving the first data.

10. A method for securely transmitting data between a client and a cloud storage or server through a gateway, the method comprising:
- establishing, by the gateway, a secure connection with the client;
- receiving, by the gateway, first data transmitted from the client to the gateway over the secure connection, the first data including an unencrypted portion and an encrypted portion;
- terminating, by the gateway, the secure connection after the gateway receives the first data;
- decrypting, by the gateway using a first transport encryption protocol, the encrypted portion to provide first decrypted data;
- deriving, by the gateway, a first key stored in the gateway from the unencrypted portion;
- encrypting, by the gateway using the first key, the first decrypted data to provide first encrypted data;
- encrypting, by the gateway using a second transport protocol, the first encrypted data to provide second encrypted data; and
- sending, by the gateway, the second encrypted data to the cloud storage or server.

11. The method of claim 10, further comprising loading the first key into the gateway and pre-associating the first key with the client.

12. The method of claim 11, wherein the encrypted portion is encrypted using a symmetric encryption algorithm and the unencrypted portion includes file header information to be used by the gateway to derive the first key.

13. The method of claim 10, further comprising authenticating, by the gateway, the client using one or more authentication factors before receiving the first data from the client.

14. A gateway for securely transmitting data between a client and a cloud storage or server, the gateway comprising:
- at least one processor; and
- memory containing instructions configured to instruct the at least one processor to:
  - receive first data from the client, the first data including an unencrypted portion and an encrypted portion;
  - decrypt the encrypted portion using a first transport protocol to provide first decrypted data;
  - derive a first key stored in the gateway from the unencrypted portion;
  - encrypt, using the first key, the first decrypted data to provide first encrypted data;
  - encrypt, using a second transport protocol, the first encrypted data to provide second encrypted data; and
  - send the second encrypted data to the cloud storage or server.

15. The gateway of claim 14, wherein the first key is loaded to the gateway and pre-associated with the client.

16. The gateway of claim 14, wherein the encrypted portion is encrypted using a symmetric encryption algorithm and the unencrypted portion includes file header information for deriving the first key.

17. The gateway of claim 14, wherein the instructions are further configured to authenticate the client using one or multiple authentication factors before receiving the first data from the client.

18. The gateway of claim 14, wherein the instructions are further configured to establish a secure connection between the gateway and the client for transmitting the first data after the gateway receives a connection request from the client.

* * * * *